US012535765B2

(12) United States Patent
Hayashida et al.

(10) Patent No.: US 12,535,765 B2
(45) **Date of Patent: *Jan. 27, 2026**

(54) IMAGE FORMING APPARATUS INCLUDING A DETACHABLE UNIT WITH POSITIONING PORTIONS

(71) Applicant: CANON KABUSHIKI KAISHA, Tokyo (JP)

(72) Inventors: Kei Hayashida, Tokyo (JP); Kohei Koguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,886

(22) Filed: Jul. 19, 2024

(65) Prior Publication Data

US 2024/0377785 A1 Nov. 14, 2024

Related U.S. Application Data

(63) Continuation of application No. 18/468,878, filed on Sep. 18, 2023, now Pat. No. 12,072,663, which is a (Continued)

(30) Foreign Application Priority Data

May 21, 2021 (JP) ................................ 2021-086128

(51) Int. Cl.
*G03G 21/16* (2006.01)
*G03G 21/18* (2006.01)

(52) U.S. Cl.
CPC ..... *G03G 21/1633* (2013.01); *G03G 21/1647* (2013.01); *G03G 21/1661* (2013.01); *G03G 21/1842* (2013.01); *G03G 2221/1869* (2013.01)

(58) Field of Classification Search
CPC ........... G03G 21/1633; G03G 21/1647; G03G 21/1661; G03G 21/1676; G03G 21/1685;
(Continued)

(56) References Cited

U.S. PATENT DOCUMENTS 12,072,663 B2 * 8/2024 Hayashida ......... G03G 21/1633
2011/0311269 A1 12/2011 Murooka
(Continued)

FOREIGN PATENT DOCUMENTS

CN 1367411 A 9/2002
CN 103186089 A 7/2013
(Continued)

OTHER PUBLICATIONS

Office Action issued in Chinese Appln. No. 202210549480.1 mailed on Feb. 7, 2025. English translation provided.
(Continued)

*Primary Examiner* — Sophia S Chen
(74) *Attorney, Agent, or Firm* — ROSSI, KIMMS & McDOWELL LLP

(57) ABSTRACT

An image forming apparatus configured to form an image on a sheet, the image forming apparatus includes an apparatus body, and a detachable unit. The detachable unit includes a first positioned portion and a second positioned portion. The apparatus body includes a frame member having a first positioning portion and a second positioning portion which respectively engage with the first positioned and second positioned portion, so that the detachable unit is positioned with respect to frame member in the attaching direction and the first direction. The second positioning portion is arranged closer to a center portion of the detachable unit in the second direction than the first positioning portion.

11 Claims, 13 Drawing Sheets

Related U.S. Application Data continuation of application No. 17/746,318, filed on May 17, 2022, now Pat. No. 11,815,844.

(58) Field of Classification Search
CPC ........... G03G 21/1842; G03G 21/1853; G03G 221/163; G03G 221/1639; G03G 221/1869; G03G 2221/163; G03G 2221/1639; G03G 2221/1869
See application file for complete search history.

(56) References Cited

U.S. PATENT DOCUMENTS

| | | | |
|---|---|---|---|
| 2013/0259520 | A1 | 10/2013 | Miwa |
| 2014/0086628 | A1 | 3/2014 | Toriyama et al. |
| 2016/0231698 | A1 | 8/2016 | Miyoshi et al. |
| 2020/0341427 | A1 | 10/2020 | Komatsu et al. |
| 2021/0063957 | A1 | 3/2021 | Sato et al. |

FOREIGN PATENT DOCUMENTS

| | | | |
|---|---|---|---|
| CN | 209570807 | U | 11/2019 |
| EP | 2645182 | A2 | 10/2013 |
| JP | 3893405 | B2 | 3/2007 |
| JP | 2020112731 | A | 7/2020 |
| JP | 2020134697 | A | 8/2020 |
| KR | 1020070021210 | A | 2/2007 |

OTHER PUBLICATIONS

Quayle Action issued in U.S. Appl. No. 17/746,318, mailed Apr. 18, 2023.
Notice of Allowance issued in U.S. Appl. No. 17/746,318, mailed Jul. 6, 2023.
Notice of Allowance issued in U.S. Appl. No. 18/468,878, mailed on Apr. 24, 2024.

* cited by examiner

IMAGE FORMING APPARATUS INCLUDING A DETACHABLE UNIT WITH POSITIONING PORTIONS

BACKGROUND OF THE INVENTION

Field of the Invention

The present invention relates to image forming apparatuses for forming images on sheets.

Description of the Related Art

Hitherto, there has been proposed an image forming apparatus having a process cartridge detachably supported on an apparatus body, wherein the process cartridge can be replaced (refer to Japanese Patent Application Laid-Open Publication No. 2020-112731). The apparatus body of the above-mentioned image forming apparatus includes a pair of side panels arranged on right and left sides, wherein two rail-like grooves are formed on each side panel. The process cartridge is positioned by having a first positioning portion and a second positioning portion of the process cartridge engage with an end portion of the grooves.

However, according to the side panels disclosed in Japanese Patent Application Laid-Open Publication No. 2020-112731, two large rail-like grooves are formed on the same plane, such that stiffness of the side panels is possibly reduced. If the stiffness of the side panels supporting the process cartridge is reduced, positioning accuracy of the process cartridge may be deteriorated.

Therefore, the present invention provides an image forming apparatus having an improved positioning accuracy of a detachable unit with respect to the apparatus body.

SUMMARY OF THE INVENTION

According to a first aspect of the present invention, an image forming apparatus configured to form an image on a sheet, the image forming apparatus includes an apparatus body, and a detachable unit detachably attached to the apparatus body in an attaching direction. The detachable unit includes a first positioned portion and a second positioned portion which are provided in an end portion of the detachable unit in a second direction perpendicular to the attaching direction and a first direction, the second positioned portion being provided downstream of the first positioned portion in the attaching direction. The apparatus body includes a frame member provided on a side of the end portion of the detachable unit in the second direction and having a first positioning portion and a second positioning portion which respectively engage with the first positioned and second positioned portion, so that the detachable unit is positioned with respect to frame member in the attaching direction and the first direction. At least a portion of the second positioning portion aligns with the first positioning portion in the attaching direction when viewed in the second direction. The second positioning portion is arranged closer to a center portion of the detachable unit in the second direction than the first positioning portion.

According to a second aspect of the present invention, an image forming apparatus configured to form an image on a sheet, the image forming apparatus includes an apparatus body, and a detachable unit detachably attached to the apparatus body in an attaching direction. The detachable unit includes a first positioned portion and a second positioned portion which are provided in an end portion of the detachable unit in a second direction perpendicular to the attaching direction and a first direction, the second positioned portion being provided downstream of the first positioned portion in the attaching direction. The apparatus body includes a metal plate which is provided on a side of the end portion of the detachable unit in the second direction and which includes a first surface and a second surface which extend in the attaching direction and the first direction, the second surface being formed by drawing so that the second surface is positioned closer to a center portion of the detachable unit in the second direction than the first surface. The first surface and the second surface have a first positioning portion and a second positioning portion which respectively engage with the first positioned portion and the second positioned portion of the detachable unit, so that the detachable unit is positioned with respect to the metal plate in the attaching direction and the first direct, the second positioning portion being provided closer to the center portion of the detachable unit in the second direction than the first positioning portion.

Further features of the present invention will become apparent from the following description of exemplary embodiments with reference to the attached drawings.

DESCRIPTION OF THE EMBODIMENTS

Embodiments for carrying out the present technique will be described in detail below based on examples with reference to the drawings. Note that dimensions, materials, shapes, and relative arrangements of components described in the embodiments are to be varied arbitrarily according to the configuration and various conditions of the apparatus to which the technique is applied. In other words, the following description of embodiments are not intended to limit the scope of the invention.

First Embodiment

Figure 1:
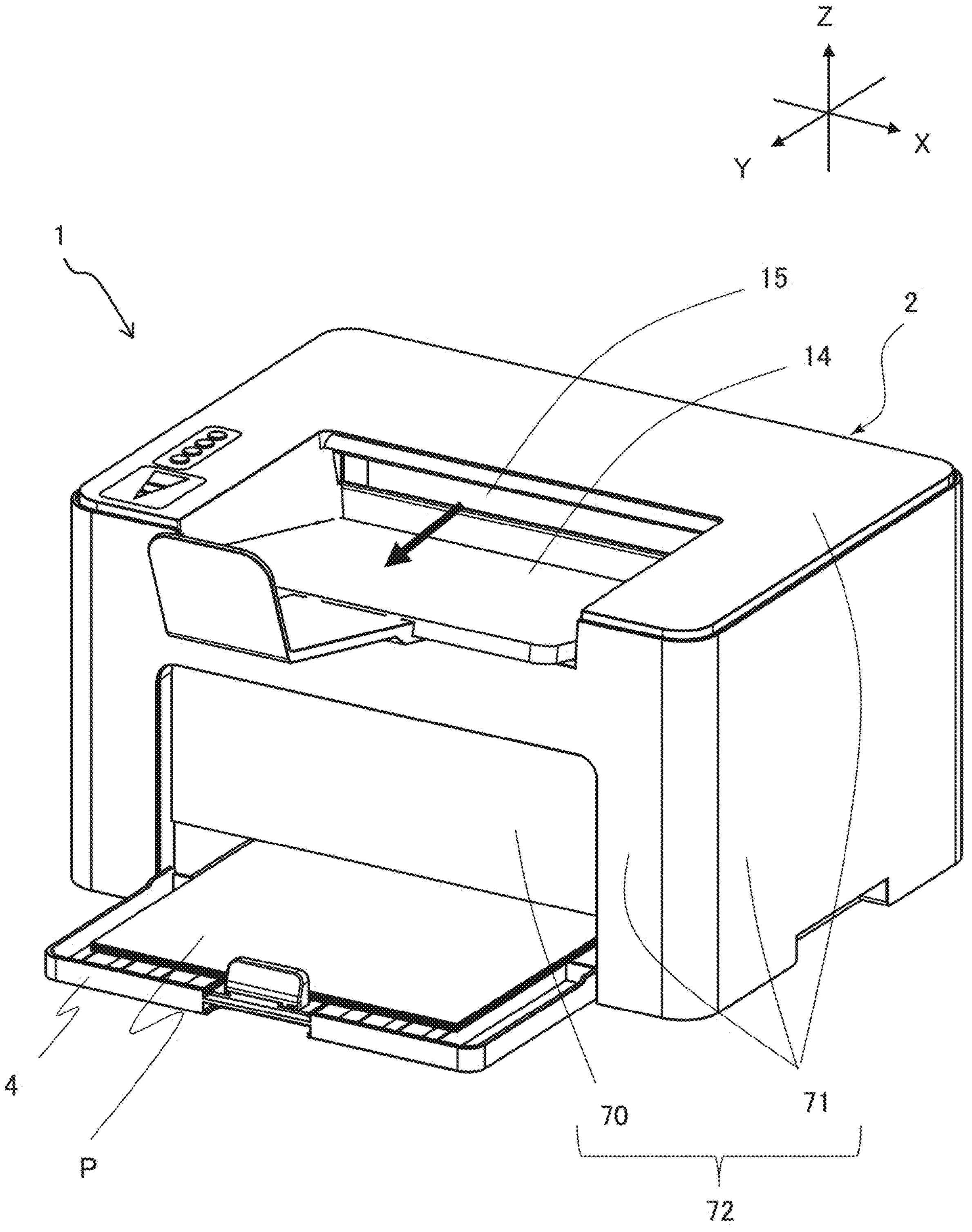
FIG. 1 is an entire schematic diagram illustrating an image forming apparatus according to a first embodiment.
Figure 2:
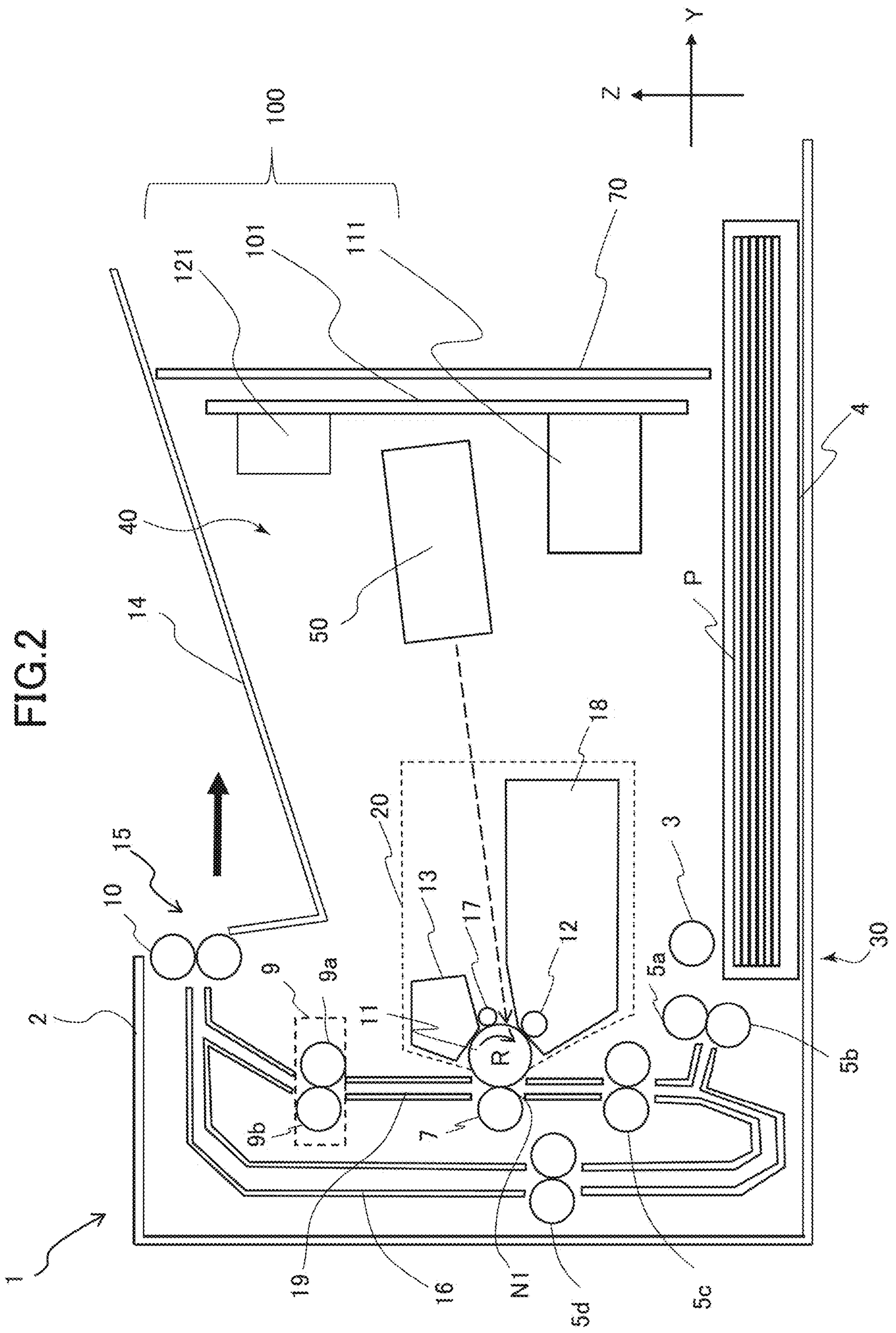
FIG. 2 is a cross-sectional view illustrating a configuration of the image forming apparatus.

FIG. 1 is a perspective view illustrating an image forming apparatus 1 according to a first embodiment. FIG. 2 is a cross-sectional view illustrating a configuration of the image forming apparatus 1. The image forming apparatus 1 is a monochrome printer for forming images on recording materials based on an image information entered from an external device. The recording materials can be sheet materials formed of various materials, including paper such as normal paper and thick paper, plastic films such as OHP sheets, special shaped sheets such as envelopes and index paper, and cloths.

In the following description, a height direction of the image forming apparatus 1 in a state where the image forming apparatus 1 is arranged on a horizontal plane, i.e., a direction opposite to a vertical direction, is referred to as a Z direction. A direction that intersects the Z direction and that is parallel to a rotational axis direction, i.e., main scanning direction, of a photosensitive drum 11 described later is referred to as an X direction. A direction intersecting the X direction and the Z direction is referred to as a Y direction. The X direction, the Y direction, and the Z direction preferably perpendicularly intersect one another. Further, for convenience, a positive side in the X direction is referred to as a right side and a negative side thereof is referred to as a left side, a positive side in the Y direction is referred to as a front side and a negative side thereof is referred to as a rear side, and a positive side in the Z direction is referred to as an upper side and a negative side thereof is referred to as a lower side.

Entire Configuration

The image forming apparatus 1 includes, as illustrated in FIGS. 1 and 2, an image forming unit 40 for forming a toner image on a recording material, a feed unit 30 for feeding a recording material P, a fixing unit 9 for fixing a toner image formed by the image forming unit 40 on the recording material, and a sheet discharge roller pair 10.

The image forming unit 40 includes a scanner unit 50, a process unit 20 adopting an electrophotographic system, and a transfer roller 7 for transferring a toner image formed on a photosensitive drum 11 of the process unit 20 to the recording material P serving as a sheet. The process unit 20 includes the photosensitive drum 11, a cleaning unit 13, a charging roller 17, a developing roller 12, and a storage portion 18 storing a toner, which are arranged around the photosensitive drum 11. The process unit 20 can be attached to an apparatus body 2 of the image forming apparatus 1 using screws, and it can be detached by a service personnel.

The photosensitive drum 11 serving as an image bearing member is a photoreceptor formed in a cylindrical shape. The photosensitive drum 11 according to the present embodiment includes a photosensitive layer formed of a negatively charged organic photoreceptor on a drum-shaped base formed of aluminum. Further, the photosensitive drum 11 serving as a rotatable member is driven to rotate about a rotational axis extending in a longitudinal direction LD (with reference to FIG. 4) at a predetermined processing speed to a predetermined direction (R direction in the drawing) by a motor.

The charging roller 17 abuts against the photosensitive drum 11 with a predetermined contact pressure to form a charging portion. Further, by having a desired charging voltage applied from a charging high-voltage power supply to the charging roller 17, the surface of the photosensitive drum 11 is uniformly charged to a predetermined potential. According to the present embodiment, the photosensitive drum 11 is charged to negative polarity by the charging roller 17.

The scanner unit 50 performs scanning exposure of a surface of the photosensitive drum 11 by irradiating the photosensitive drum 11 with laser light using a polygon mirror in response to the image information entered from the external device. By the exposure, an electrostatic latent image corresponding to the image information is formed on a surface of the photosensitive drum 11. The scanner unit 50 is not limited to a laser scanner device, and for example, an LED exposing unit including an LED array in which a plurality of LEDs are arranged along a longitudinal direction of the photosensitive drum 11 can be adopted.

The developing roller 12 is supported rotatably by the storage portion 18 serving as a toner storage portion. Further, the developing roller 12 is arranged so as to oppose the photosensitive drum 11. Further, a feed roller for applying toner serving as developer stored in the storage portion 18 to the surface of the developing roller 12 can be provided in the storage portion 18.

The process unit 20 serving as a detachable unit according to the present embodiment utilizes a contact developing system serving as a developing system. That is, a toner layer borne on the developing roller 12 contacts the photosensitive drum 11 at a developing portion, i.e., developing area, in which the photosensitive drum 11 and the developing roller 12 oppose one another. A developing voltage is applied to the developing roller 12 from a developing high voltage power supply. Under the developing voltage, toner borne on the developing roller 12 is transferred from the developing roller 12 to the drum surface according to electric potential distribution on the surface of the photosensitive drum 11, by which the electric latent image is developed into a toner image.

Toner according to the present embodiment is a so-called one-component developer that does not contain a magnetic component, and toner is borne on the developing roller 12 mainly by intermolecular force and electrostatic force, i.e., image force. It is also possible to use one-component developer containing a magnetic component. In addition to toner particles, one-component developer may contain additives, such as wax and silica microparticles, for adjusting fluidity and charging performance. Further, two-component developer composed of a nonmagnetic toner as developer and a magnetic carrier can also be used. If a magnetic developer is used, a cylindrical developing sleeve having magnets arranged on an inner side thereof can be used as the developer bearing member, for example.

The fixing unit 9 adopts a heat fixing system for fixing images by heating and melting toner on the recording material and simultaneously applying pressure. The fixing unit 9 includes a heating roller 9*a* including a fixing heater and a pressure roller 9*b* in pressure contact with the heating roller 9*a*. Each of the heating roller 9*a* and the pressure roller 9*b* is a rotatable member configured to rotate about a rotational axis extending in a longitudinal direction LD (with reference to FIG. 4).

The feed unit 30 includes a cassette 4 on which the recording material P is placed, a pickup roller 3, a feed roller 5*a,* and a separation roller 5*b.* A front cover 70 is provided at a portion of an end face on a front side of the image forming apparatus 1, and the front cover 70 covers a circuit board 100. The apparatus body 2 of the image forming apparatus 1 includes a casing 72. The casing 72 includes the front cover 70, a sheet discharge tray 14, a rear cover 75 (refer to FIGS. 3A and 3B), and an exterior cover 71 constituting an exterior of the image forming apparatus 1 other than the front cover 70, the sheet discharge tray 14, and the rear cover 75. A sheet discharge port 15 through which sheets discharged to the sheet discharge tray 14 passes is formed on the casing 72.

Further, a replenishing port 200 (refer to FIG. 4) serving as an inlet port for receiving toner supplied from an exterior of the process unit 20 is formed on the process unit 20. The replenishing port 200 is communicated with the storage portion 18, and it is exposed by opening the sheet discharge tray 14 upward in a state where the process unit 20 is attached to the apparatus body 2. The user can attach a toner container for replenishment to the replenishing port 200 being exposed to replenish toner to the storage portion 18 via the replenishing port 200. That is, toner is supplied into the storage portion 18 through the replenishing port 200. As described, the process unit 20 according to the present embodiment enables to supply toner to the storage portion 18 while it is attached to the apparatus body 2.

As illustrated in FIG. 2, the image forming apparatus 1 includes the circuit board 100. The circuit board 100 is composed of a wiring board 101 formed of an insulator, and electronic components 111 and 121 soldered onto the wiring board 101. Conductor wiring is arranged on a surface and in an interior of the wiring board 101, by which the electronic components 111 and 121 are electrically connected. The circuit board 100 has a function to convert an AC current supplied from the exterior of the image forming apparatus 1 to direct current, or to convert an input voltage to acquire a predetermined voltage necessary for the image forming process.

The circuit board 100 is arranged such that the surface of the wiring board 101 on which the electronic components 111 and 121 are mounted is disposed in a direction intersecting a direction of discharge. Further, the wiring board 101 is arranged between the front cover 70 and the scanner unit 50 in the direction of discharge. The electronic components 111 and 121 are disposed on a side of the wiring board 101 opposing the scanner unit 50.

Next, an image forming operation of the image forming apparatus 1 will be described. When an image forming command is entered to the image forming apparatus 1, an image forming process by the image forming unit 40 will be started based on an image information entered from an external computer connected to the image forming apparatus 1. The scanner unit 50 irradiates a laser light toward the photosensitive drum 11 based on the image information being entered. In this state, the photosensitive drum 11 is charged in advance by the charging roller 17, and by having the laser light irradiated thereon, an electrostatic latent image is formed on the photosensitive drum 11. Thereafter, the electrostatic latent image is developed by the developing roller 12, and a toner image is formed on the photosensitive drum 11.

In parallel with the image forming process described above, the pickup roller 3 of the feed unit 30 sends out the recording material P supported on the cassette 4. The recording material P is separated one by one by the feed roller 5*a* and the separation roller 5*b* and conveyed to a conveyance roller pair 5*c*. Then, the recording material P is conveyed by the conveyance roller pair 5*c* serving as a conveyance portion to a transfer nip N1 formed of the transfer roller 7 and the photosensitive drum 11.

A transfer voltage is applied from a transfer high voltage power supply to the transfer roller 7, and the toner image borne on the photosensitive drum 11 is transferred to the recording material P being conveyed by the conveyance roller pair 5*c*. The recording material P to which the toner image has been transferred is conveyed to the fixing unit 9, and the toner image is heated and pressed while passing through a nip portion formed between the heating roller 9*a* and the pressure roller 9*b* of the fixing unit 9. Thereby, toner particles are melted and then solidified, by which the toner image is fixed to the recording material P. The recording material P having passed through the fixing unit 9 is discharged by the sheet discharge roller pair 10 from the sheet discharge port 15 to an exterior of the image forming apparatus 1, i.e., outside the apparatus, and supported on the sheet discharge tray 14.

When forming images on both sides of the recording material P, the sheet discharge roller pair 10 subjects the recording material P having an image formed on a first surface to switchback, by which the recording material P is guided to a duplex conveyance path 16. The recording material P guided to the duplex conveyance path 16 is conveyed by a duplex conveyance roller pair 5*d* toward the transfer roller 7 again. An image is formed on a second surface of the recording material P by the transfer roller 7, and thereafter, the sheet is discharged to the exterior of the apparatus by the sheet discharge roller pair 10. After the toner image has been transferred to the recording material P, toner remaining on the photosensitive drum 11 is cleaned by the cleaning unit 13.

Figure 3A:
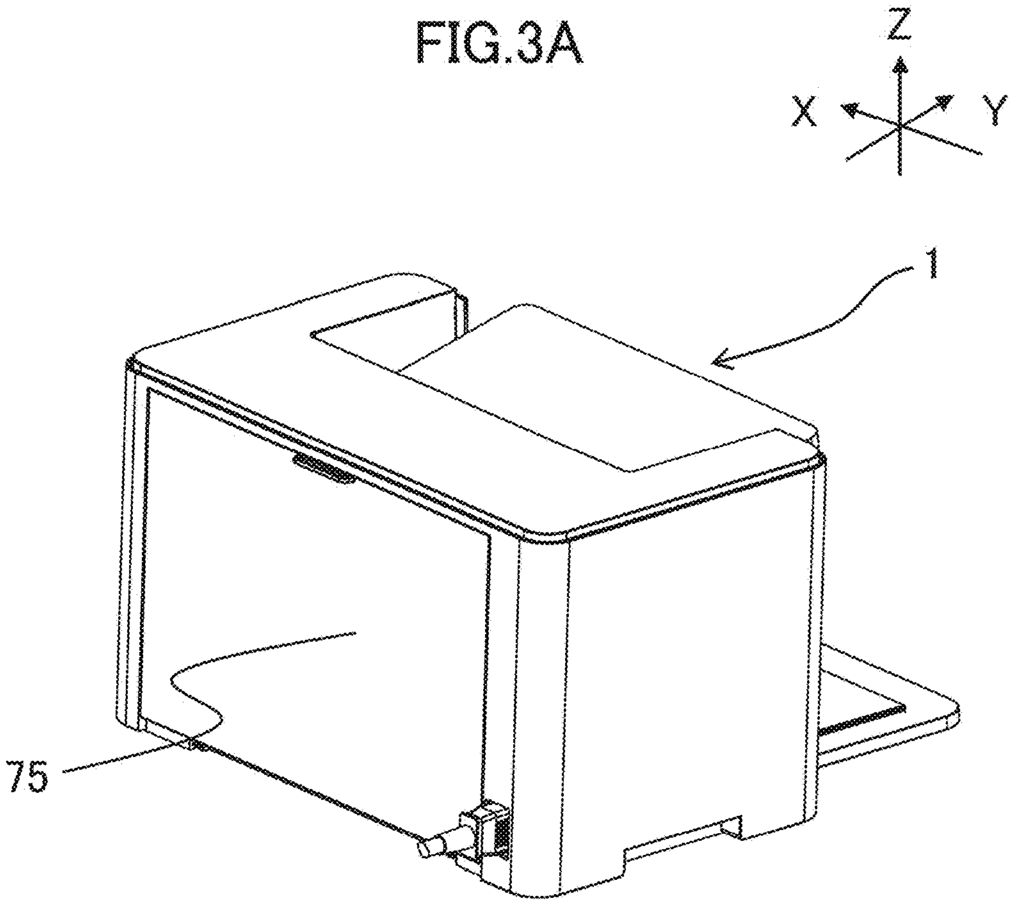
FIG. 3A is a perspective view illustrating the image forming apparatus with a rear cover closed.
Figure 3B:
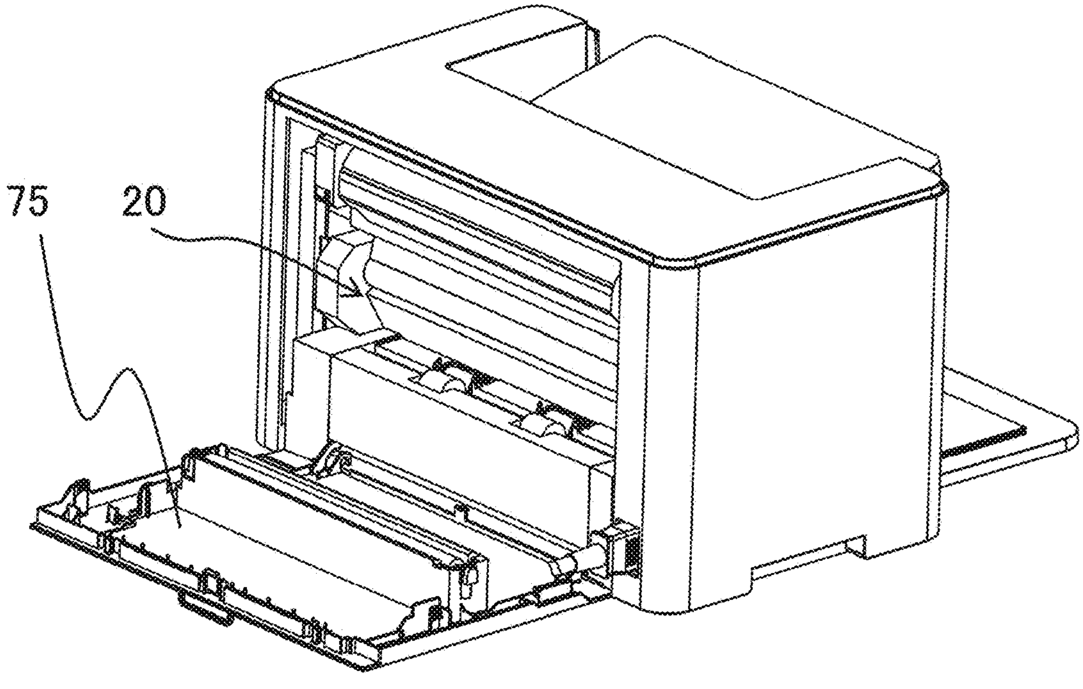
FIG. 3B is a perspective view illustrating the image forming apparatus with the rear cover opened.

As illustrated in FIGS. 3A and 3B, the rear cover 75 supported in an openable and closable manner is provided on a rear side of the image forming apparatus 1. The rear cover 75 serving as an opening and closing member covers the process unit 20 when in a closed state and exposes the process unit 20 when opened. The process unit 20 can be attached to the apparatus body 2 in an attaching direction AD illustrated in FIG. 4 in a state where the rear cover 75 is opened, and can be detached in a detaching direction that is opposite the attaching direction AD. The attaching direction AD is a direction along the Y direction.

By opening the rear cover 75, the duplex conveyance path 16 (refer to FIG. 2) is exposed. That is, the rear cover 75 is movable between a closed position in which the duplex conveyance path 16 is covered and an opened position in which the duplex conveyance path 16 is exposed to the exterior. Thereby, sheet jamming that has occurred in the duplex conveyance path 16 can be solved. Further, by having a transfer unit not shown opened in a state where the duplex conveyance path 16 is positioned at the opened position, a conveyance path 19 (refer to FIG. 2) through which passes the sheet conveyed by the conveyance roller pair 5*c* is opened.

Positioning Configuration of Process Unit

Figure 4:
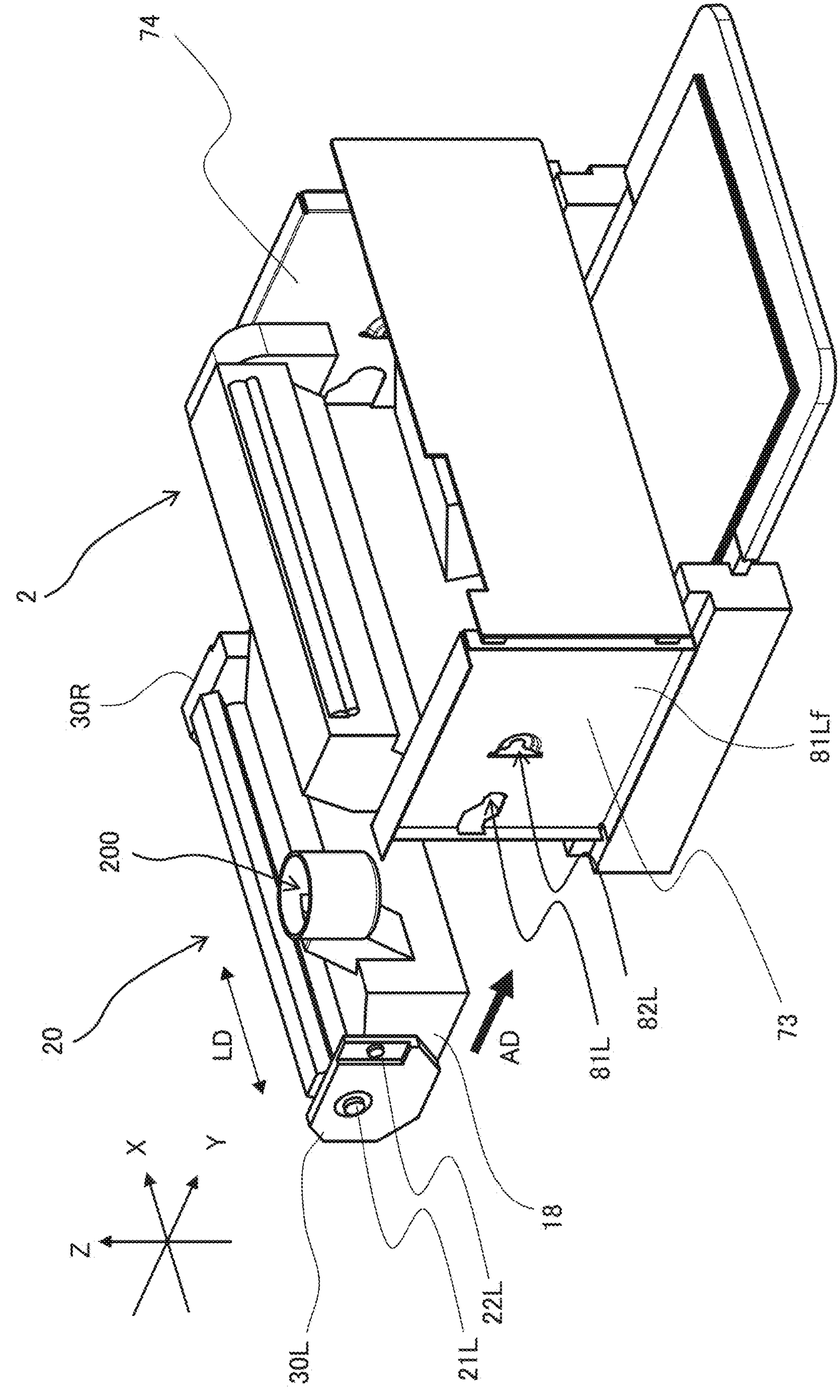
FIG. 4 is a perspective view illustrating the image forming apparatus of a state prior to attaching a process unit.
Figure 5A:
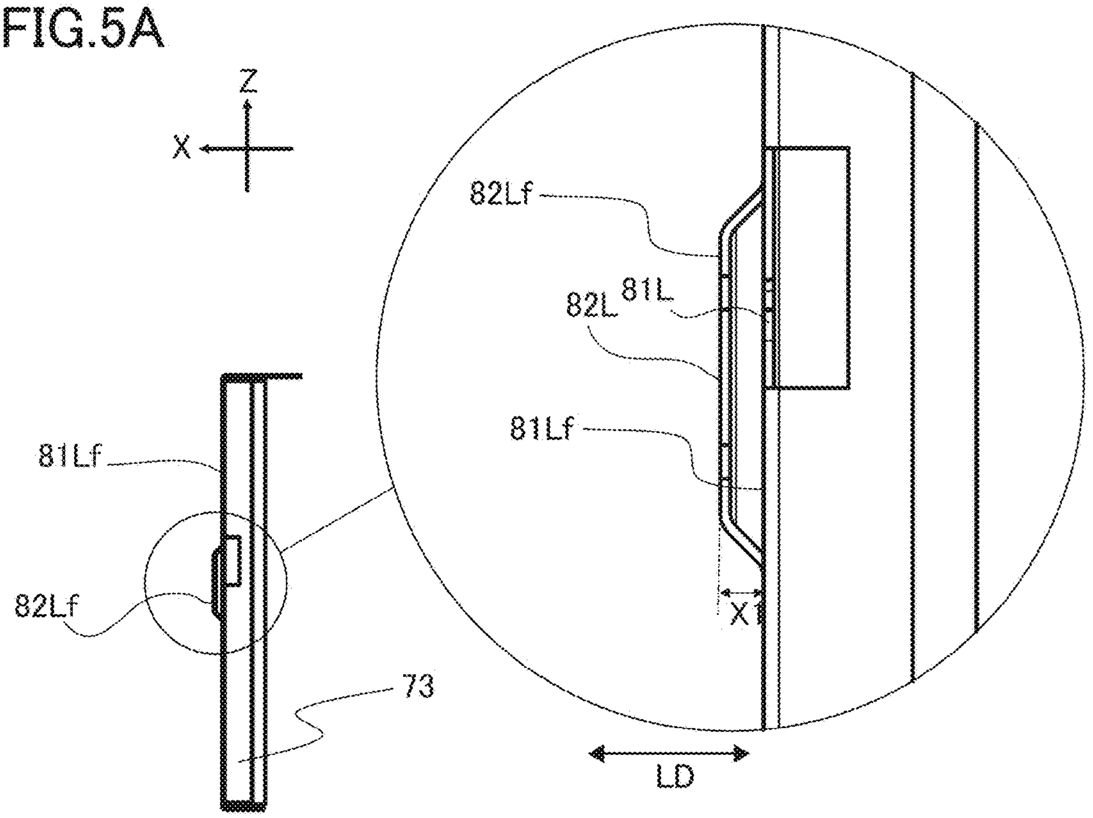
FIG. 5A is a rear view and an enlarged view illustrating a positioning configuration of the process unit by a left side panel frame.
Figure 5B:
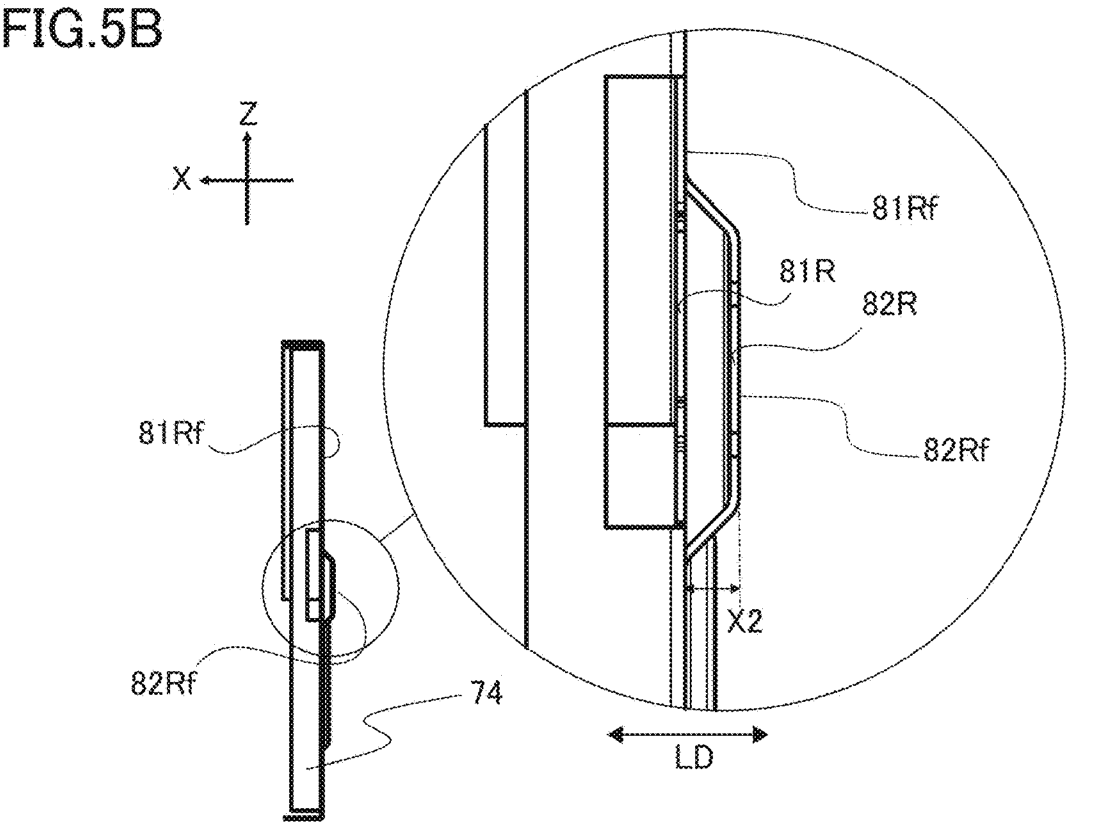
FIG. 5B is a rear view and an enlarged view illustrating a positioning configuration of the process unit by a right side panel frame.

Next, a positioning configuration of the process unit 20 will be described with reference to FIGS. 4 to 8. FIG. 4 is a perspective view illustrating the image forming apparatus 1 in a state prior to attaching the process unit 20. FIG. 5A is a rear view and an enlarged view of the positioning configuration of the process unit 20 by a left side panel frame 73, and FIG. 5B is a rear view and an enlarged view of the positioning configuration of the process unit 20 by a right side panel frame 74.

As illustrated in FIG. 4, the process unit 20 includes a left side face 30L and a right side face 30R serving as end portions in a longitudinal direction LD that is parallel to the X direction. The left side face 30L includes a left positioning boss 21L serving as a first positioned portion and a left rotation regulating boss 22L serving as a second positioned portion, whereas the right side face 30R includes a right positioning boss 21R and a right rotation regulating boss 22R (refer to FIG. 7B). The left positioning boss 21L and the right positioning boss 21R are respectively arranged upstream of the left rotation regulating boss 22L and the right rotation regulating boss 22R in the attaching direction AD of the process unit 20. In other words, the left rotation regulating boss 22L and the right rotation regulating boss 22R are respectively arranged downstream of the left positioning boss 21L and the right positioning boss 21R in the attaching direction AD.

The apparatus body 2 of the image forming apparatus 1 includes the left side panel frame 73 and the right side panel frame 74 formed of a sheet metal member, wherein the left side panel frame 73 and the right side panel frame 74 oppose one another with a clearance therebetween in the longitudinal direction LD serving as a second direction. Noted that the left side panel frame 73 is provided on a side of the left side face 30L of the process unit 20 in the longitudinal direction LD.

As illustrated in FIGS. 4 and 5A, the left side panel frame 73 serving as a frame member includes a first left surface 81Lf and a second left surface 82Lf that extend in a direction along the attaching direction AD, i.e., Y direction, and the Z direction. The second left surface 82Lf is arranged inward of the apparatus body 2 for distance X1 from the first left surface 81Lf in the longitudinal direction LD by draw-processing the first left surface 81Lf serving as a first surface. In other words, the second left surface 82Lf is arranged closer to a center portion of the process unit 20 in the longitudinal direction LD than the first left surface 81Lf. That is, the first left surface 81Lf and the second left surface 82Lf are not coplanar. In the present embodiment, the second left surface 82Lf serving as a second surface is composed of a surface parallel to the attaching direction AD, i.e., Y direction, and the Z direction, but the present technique is not limited thereto. For example, the second left surface 82Lf can be a curved surface along the attaching direction AD, i.e., Y direction, and the Z direction.

A left positioning portion 81L with which the left positioning boss 21L can engage is formed on the first left surface 81Lf, wherein the left positioning portion 81L serving as a first positioning portion is a cutout having an upstream side in the attaching direction AD opened. In other words, the left positioning portion 81L is a first opening. Or the left positioning portion 81L is a part of a slit extending from an upstream edge of the left side panel frame 73 in the attaching direction AD. A left rotation regulating portion 82L with which the left rotation regulating boss 22L can engage is formed on the second left surface 82Lf, wherein the left rotation regulating portion 82L serving as a second positioning portion is a U-shaped cutout having an upstream side in the attaching direction AD opened. In other words, the left rotation regulating portion 82L is a second opening provided on the second left surface 82Lf of the left side panel frame 73. Since the second left surface 82Lf is formed by draw-processing, an inclined surface for guiding the left positioning boss 21L toward the left positioning portion 81L can be formed.

Since the first left surface 81Lf and the second left surface 82Lf are positioned apart from each other by distance X1 in the longitudinal direction LD, the left rotation regulating portion 82L is also arranged apart by distance X1 from the left positioning portion 81L in the longitudinal direction LD. In other words, the left rotation regulating portion 82L is arranged at a position that differs from the left positioning portion 81L in the longitudinal direction LD. That is, the left rotation regulating portion 82L is arranged closer to a center portion of the process unit 20 in the longitudinal direction LD than the left positioning portion 81L.

Similarly, as illustrated in FIGS. 4 and 5B, the right side panel frame 74 includes a first right surface 81Rf and a second right surface 82Rf that extend along the attaching direction AD, i.e., Y direction, and the Z direction. The second right surface 82Rf is arranged inward of the apparatus body 2 for distance X2 from the first right surface 81Rf in the longitudinal direction LD by draw-processing the first right surface 81Rf. That is, the first right surface 81Rf and the second right surface 82Rf are not coplanar. In the present embodiment, the first right surface 81Rf and the second right surface 82Rf are composed of a surface parallel to the attaching direction AD, i.e., Y direction, and the Z direction, but the present technique is not limited thereto. For example, the second right surface 82Rf can be a curved surface along the attaching direction AD, i.e., Y direction, and the Z direction.

A right positioning portion 81R with which the right positioning boss 21R can engage is formed on the first right surface 81Rf, wherein the right positioning portion 81R is a cutout having an upstream side in the attaching direction AD opened. A right rotation regulating portion 82R with which the right rotation regulating boss 22R can engage is formed on the second right surface 82Rf, wherein the right rotation regulating portion 82R is a U-shaped cutout having an upstream side in the attaching direction AD opened. Since the second right surface 82Rf is formed by draw-processing, an inclined surface for guiding the right positioning boss 21R toward the right positioning portion 81R can be formed.

Since the first right surface 81Rf and the second right surface 82Rf are positioned apart from each other by distance X2 in the longitudinal direction LD, the right rotation regulating portion 82R is also arranged apart by distance X2 from the right positioning portion 81R in the longitudinal direction LD. In other words, the right rotation regulating portion 82R is arranged at a position that differs from the right positioning portion 81R in the longitudinal direction LD.

Figure 6A:
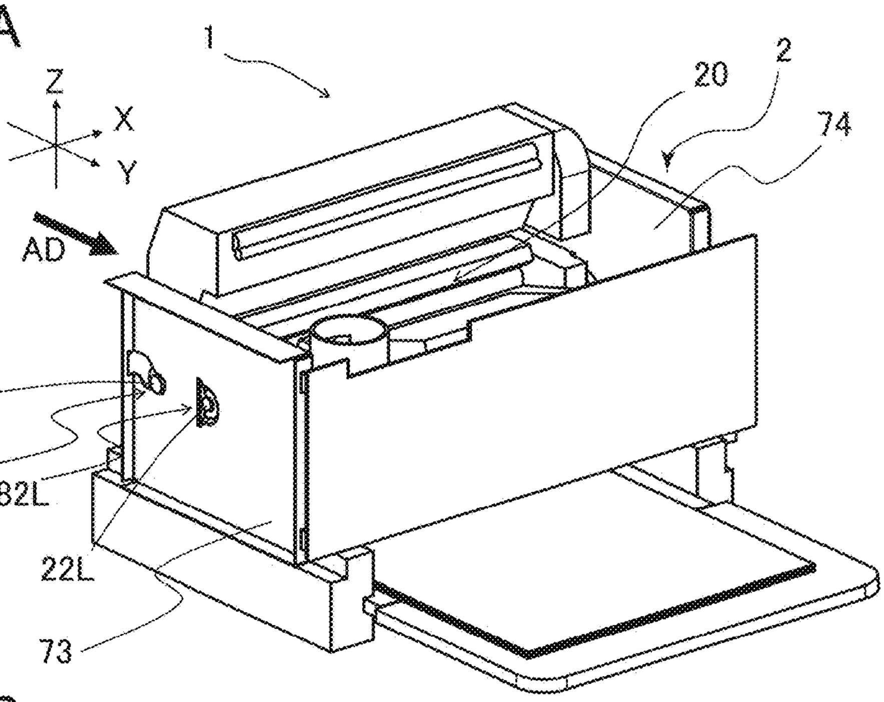
FIG. 6A is a perspective view illustrating an image forming apparatus with the process unit attached.
Figure 6B:
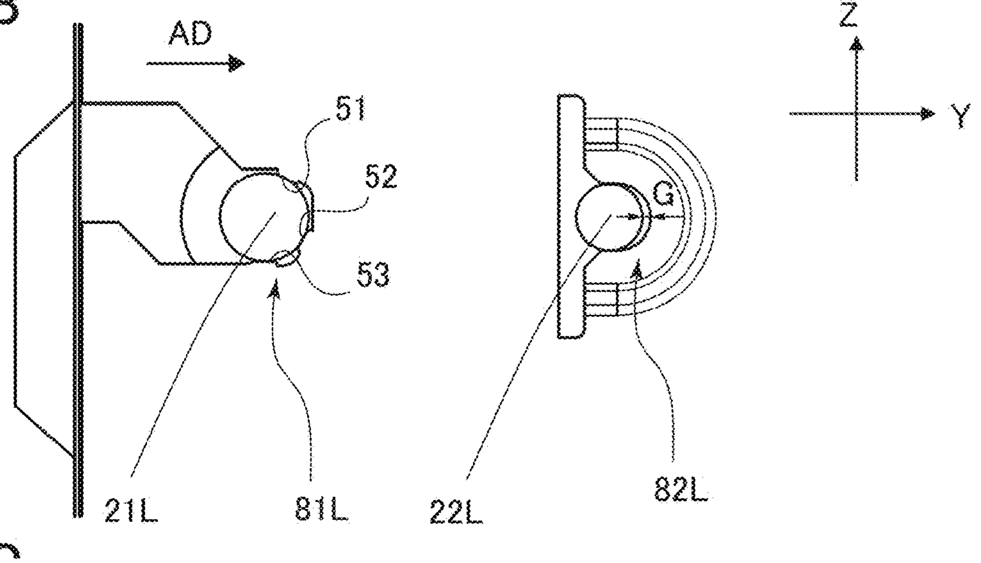
FIG. 6B is an enlarged view illustrating a left positioning portion and a left rotation regulating portion.

FIG. 6A is a schematic view illustrating the image forming apparatus 1 in a state where the process unit 20 is attached, and FIG. 6B is an enlarged view illustrating the left positioning portion 81L and the left rotation regulating portion 82L. As illustrated in FIGS. 5A to 6B, in a state where the process unit 20 is attached to the apparatus body 2, the process unit 20 is urged from a rear side toward a front side by an urging mechanism not shown. In a state where the process unit 20 is attached to the apparatus body 2, the left positioning boss 21L and the left rotation regulating boss 22L of the process unit 20 are respectively engaged with the left positioning portion 81L and the left rotation regulating portion 82L of the left side panel frame 73. Similarly, in a state where the process unit 20 is attached to the apparatus body 2, the right positioning boss 21R and the right rotation regulating boss 22R of the process unit 20 are respectively engaged with the right positioning portion 81R and the right rotation regulating portion 82R of the right side panel frame 74.

By having the left positioning boss 21L and the right positioning boss 21R respectively engage with the left positioning portion 81L and the right positioning portion 81R, the process unit 20 is positioned with respect to the left side panel frame 73 and the right side panel frame 74 in the attaching direction AD. Further, by having the left rotation regulating boss 22L and the right rotation regulating boss 22R respectively engage with the left rotation regulating portion 82L and the right rotation regulating portion 82R, rotational movement of the process unit 20 about the left positioning boss 21L and the right positioning boss 21R is regulated. That is, the process unit 20 is positioned with respect to the left side panel frame 73 and the right side panel frame 74 in the Z direction serving as the first direction. A rotational axis which is a center of the left positioning boss 21L and the right positioning boss 21R extends in the longitudinal direction LD and overlaps with the left rotation regulating portion 82L and the right rotation regulating portion 82R when viewed in the longitudinal direction LD.

In further detail, as illustrated in FIG. 6B, the left positioning portion 81L includes projecting portions 51, 52, and 53 against which the left positioning boss 21L abuts. In a state where the process unit 20 is attached to the apparatus body 2, the left positioning boss 21L abuts against the projecting portions 51 and 52 in the attaching direction AD and is positioned thereby. In this state, the left positioning boss 21L abuts against the projecting portions 51, 52, and 53 in the Z direction, such that it is positioned in the Z direction. That is, the left positioning portion 81L positions the process unit 20 together with the left rotation regulating portion 82L in the Z direction.

Further, in a state where the process unit 20 is attached to the apparatus body 2, that is, in a state where the left positioning boss 21L is abutted against the projecting portions 51, 52, and 53, the left rotation regulating boss 22L has a gap G formed between the left rotation regulating portion 82L in the attaching direction AD. In other words, the left rotation regulating portion 82L is configured so as not to position the process unit 20 in the attaching direction AD in a state where the process unit 20 is positioned in the attaching direction AD by the left positioning portion 81L. Thereby, the process unit 20 can be positioned in the attaching direction AD reliably by the left positioning portion 81L, and the positioning accuracy of the process unit 20 can be improved.

The right positioning portion 81R and the right rotation regulating portion 82R adopt similar configurations as the left positioning portion 81L and the left rotation regulating portion 82L, such that descriptions thereof are omitted.

Figure 6C:
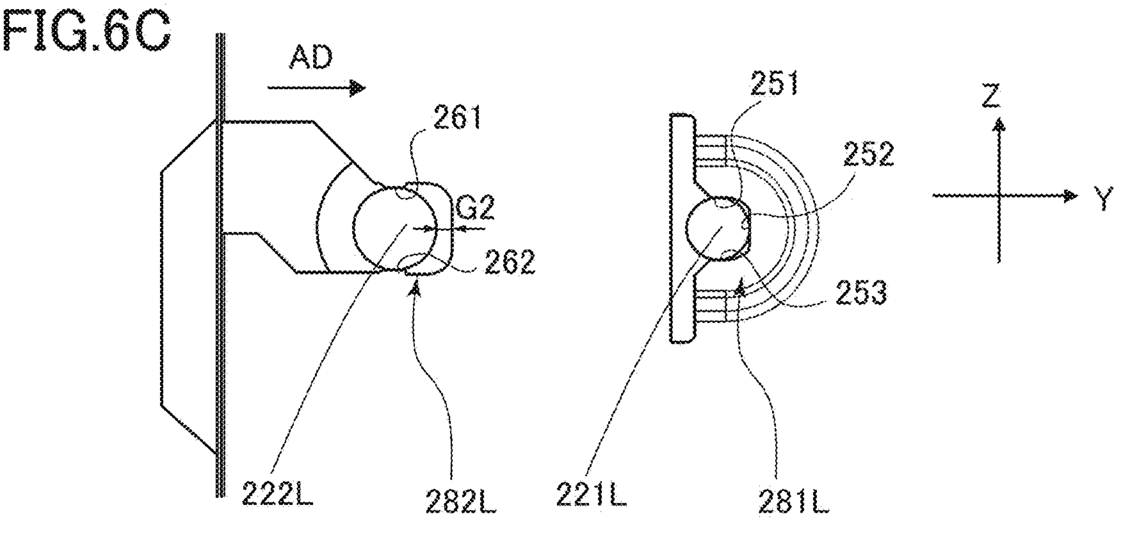
FIG. 6C is an enlarged view illustrating a left positioning portion and a left rotation regulating portion according to a modified example of the first embodiment.

FIG. 6C is an enlarged view illustrating a left positioning portion 281L and a left rotation regulating portion 282L according to a modified example of the first embodiment. According to the present embodiment illustrated in FIG. 6B, the left positioning portion 81L is arranged upstream of the left rotation regulating portion 82L in the attaching direction AD, but the present technique is not limited thereto. For example, as illustrated in FIG. 6C, the left positioning portion 281L serving as a first positioning portion can be arranged downstream of the left rotation regulating portion 282L serving as a second positioning portion in the attaching direction AD.

The left positioning portion 281L has faces 251, 252, and 253, wherein the faces 251 and 253 oppose one another in the Z direction. In a state where the process unit 20 is attached to the apparatus body 2, a left positioning boss 221L serving as a first positioned portion abuts against the face 252 of the left positioning portion 281L and is positioned in the attaching direction AD. Further, at this time, the left positioning boss 221L also abuts against the faces 251 and 253 in the Z direction, by which it is also positioned in the Z direction.

The left rotation regulating portion 282L includes projecting portions 261 and 262. A left rotation regulating boss 222L serving as a second positioned portion is positioned in the Z direction by abutting against the projecting portions 261 and 262 in a state where the process unit 20 is positioned in the attaching direction AD by the left positioning portion 81L. Further, in this state, the left rotation regulating boss 222L has a gap G2 formed between the left rotation regulating portion 282L in the attaching direction AD. In other words, the left rotation regulating portion 282L is configured so as not to position the process unit 20 in the attaching direction AD in a state where the process unit 20 is positioned in the attaching direction AD by the left positioning portion 281L. Thereby, the process unit 20 can be positioned in the attaching direction AD reliably by the left positioning portion 281L, and the positioning accuracy of the process unit 20 can be improved.

Figure 7A:
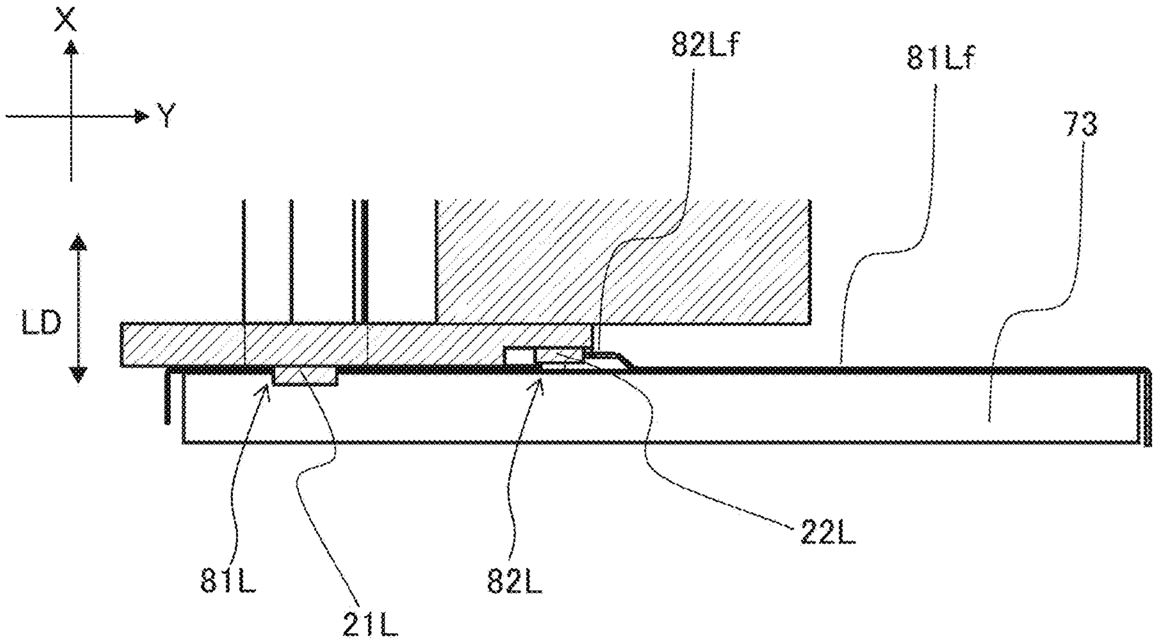
FIG. 7A is a cross-sectional view parallel to an XY plane illustrating the positioning configuration of the process unit by the left side panel frame.
Figure 7B:
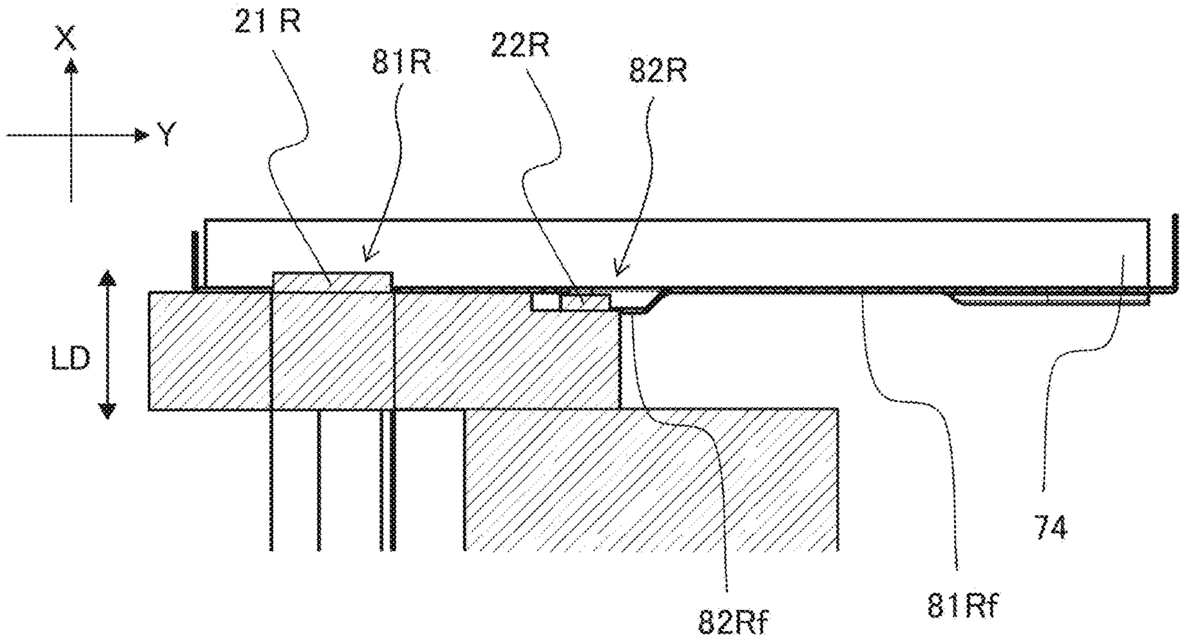
FIG. 7B is a cross-sectional view parallel to the XY plane illustrating the positioning configuration of the process unit by the right side panel frame.

FIG. 7A is a cross-sectional view taken in parallel to the XY plane of a positioning configuration of the process unit 20 by the left side panel frame 73, and FIG. 7B is a cross-sectional view taken in parallel to the XY plane of the positioning configuration of the process unit 20 by the right side panel frame 74.

As illustrated in FIG. 7A, the second left surface 82Lf on which the left rotation regulating portion 82L is formed is arranged on an inner side of the apparatus body 2 in the longitudinal direction LD with respect to the first left surface 81Lf on which the left positioning portion 81L is formed. Further, the left rotation regulating boss 22L is also arranged on the inner side of the apparatus body 2 in the longitudinal direction LD with respect to the left positioning boss 21L. Thereby, a shape of a cutout constituting the left rotation regulating portion 82L formed on the second left surface 82Lf can be formed in a relatively small area. Since the left positioning portion 81L is arranged upstream of the left rotation regulating portion 82L in the attaching direction AD, the shape of the cutout constituting the left positioning portion 81L formed on the first left surface 81Lf can also be formed in a relatively small area. As described, by reducing the area of the cutouts formed on the left side panel frame 73, the stiffness of the left side panel frame 73 can be ensured.

Similarly, as illustrated in FIG. 7B, the second right surface 82Rf on which the right rotation regulating portion 82R is formed is arranged on the inner side of the apparatus body 2 in the longitudinal direction LD with respect to the first right surface 81Rf on which the right positioning portion 81R is formed. Further, the right rotation regulating boss 22R is also arranged on the inner side of the apparatus body 2 in the longitudinal direction LD with respect to the right positioning boss 21R. Thereby, the shape of the cutout constituting the right rotation regulating portion 82R formed on the second right surface 82Rf can be formed in a relatively small area. Further, since the right positioning portion 81R is arranged upstream of the right rotation regulating portion 82R in the attaching direction AD, the shape of the cutout constituting the right positioning portion 81R formed on the first right surface 81Rf can also be formed in a relatively small area. As described, by reducing the area of the cutouts formed on the right side panel frame 74, the stiffness of the right side panel frame 74 can be ensured.

By maintaining the stiffness of the left side panel frame 73 and the right side panel frame 74, the positioning accuracy of the process unit 20 with respect to the apparatus body 2 can be improved. Further, since it is not necessary to increase the thickness of the left side panel frame 73 and the right side panel frame 74 to enhance the stiffness of the left side panel frame 73 and the right side panel frame 74, the weight and the cost of the apparatus can be cut down.

Figure 8:
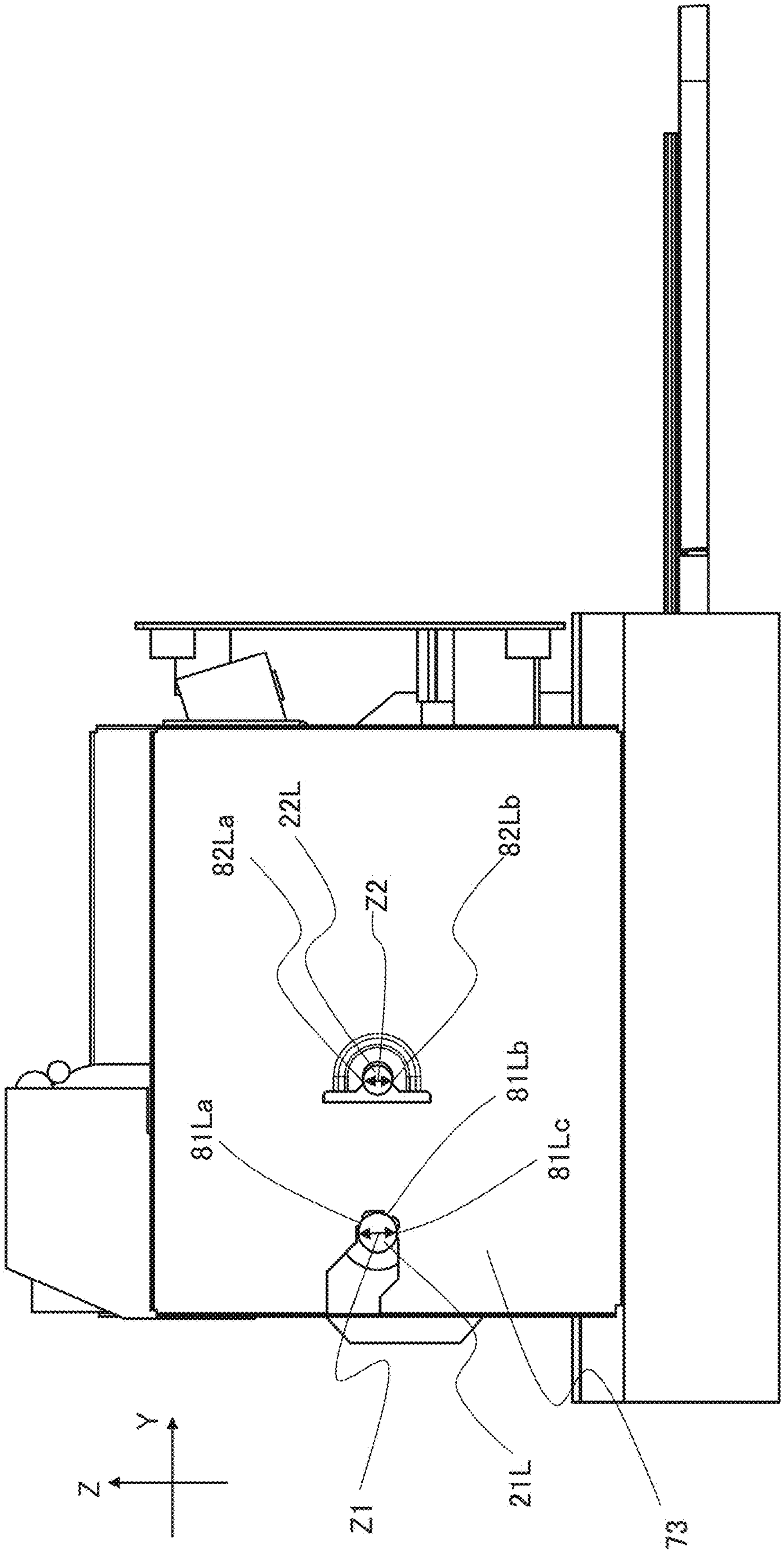
FIG. 8 is a left side view illustrating the positioning configuration of the process unit by the left side panel frame.

FIG. 8 is a left side view illustrating a positioning configuration of the process unit 20 by the left side panel frame 73. The left positioning portion 81L has, as illustrated in FIG. 8, sides 81La and 81Lc that oppose one another in the Z direction, and a side 81Lb that connects the sides 81La and 81Lc and that opposes the left positioning boss 21L in the attaching direction AD. Further, the left rotation regulating portion 82L has sides 82La and 82Lb that oppose one another in the Z direction.

The width of the left positioning portion 81L in the Z direction, that is, the distance between the sides 81La and 81Lc, is a width Z1. The width of the left rotation regulating portion 82L in the Z direction, that is, the distance between the sides 82La 82Lb, is a width Z2. Then, the left rotation regulating portion 82L is arranged such that at least a portion thereof overlaps with the left positioning portion 81L in the Z direction. In other words, at least a portion of the left rotation regulating portion 82L aligns with the left positioning portion 81L in the attaching direction AD when viewed in the longitudinal direction LD. Thereby, a movement locus of the left positioning boss 21L and the left rotation regulating boss 22L in the Z direction when attaching the process unit 20 to the apparatus body 2 overlap, and an area avoiding the movement locus within the apparatus body 2 can be suppressed. Thereby, the space within the apparatus body 2 can be utilized effectively, and the image forming apparatus 1 can be downsized.

Further, since the left positioning portion 81L and the left rotation regulating portion 82L are both provided on the single left side panel frame 73 composed of a sheet metal member, the positioning accuracy of the process unit 20 can be enhanced while suppressing crossing of components.

A similar configuration as that described above with reference to FIG. 8 is adopted in the right side panel frame 74, and a similar effect is exerted. According further to the present embodiment, axial centers of the left positioning boss 21L and the left rotation regulating boss 22L are at a same position in the Z direction, but the present technique is not limited thereto.

Second Embodiment

Next, a second embodiment of the preset technique will be described, wherein according to the second embodiment, a configuration of the second left surface 82Lf and the second right surface 82Rf of the first embodiment has been changed. Therefore, configurations similar to the first embodiment are either not shown or denoted with the same reference numbers in the drawing.

Figure 9:
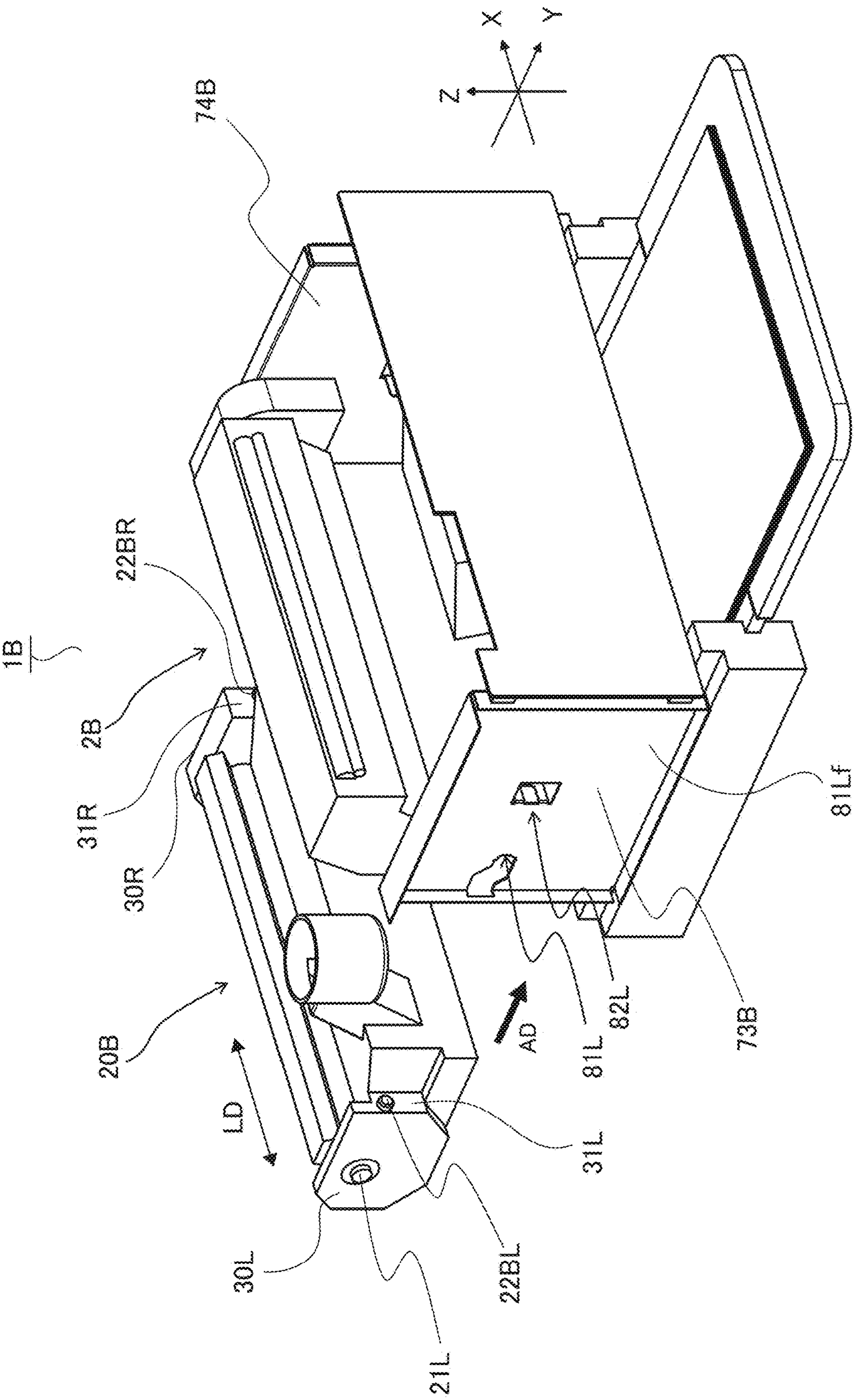
FIG. 9 is a perspective view illustrating an image forming apparatus according to a second embodiment.
Figure 10A:
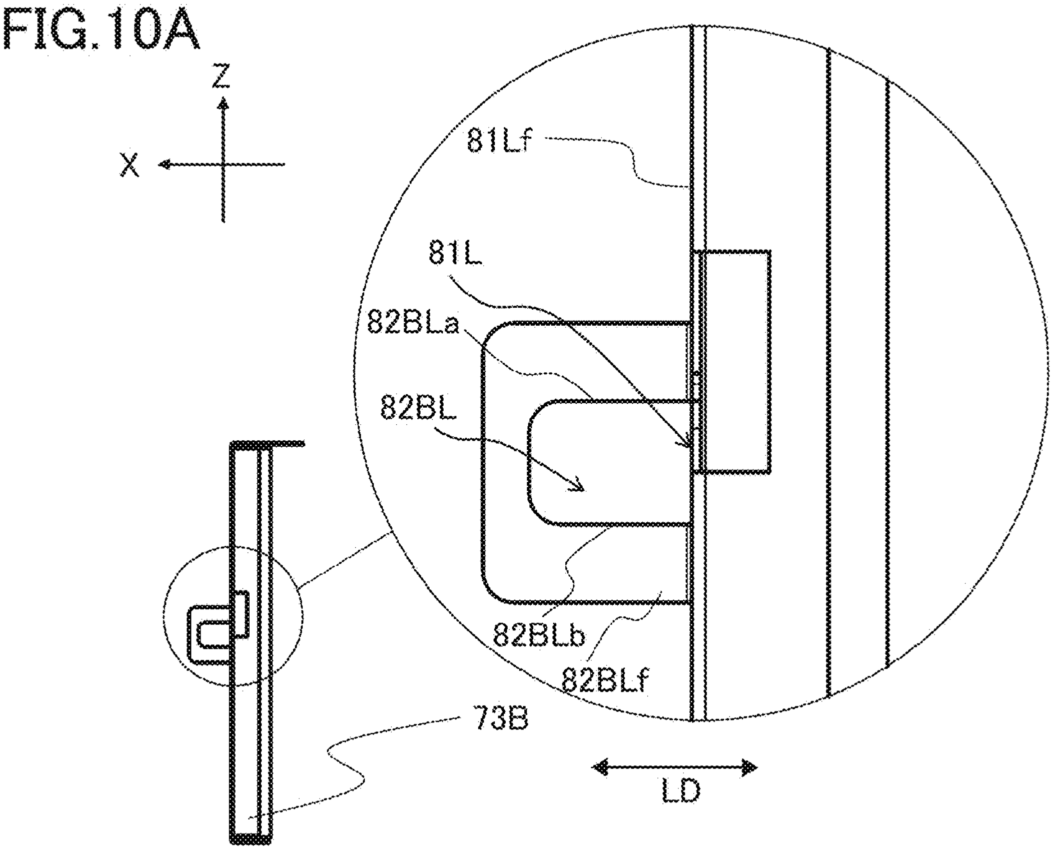
FIG. 10A is a rear view and an enlarged view illustrating a positioning configuration of a process unit by a left side panel frame.
Figure 10B:
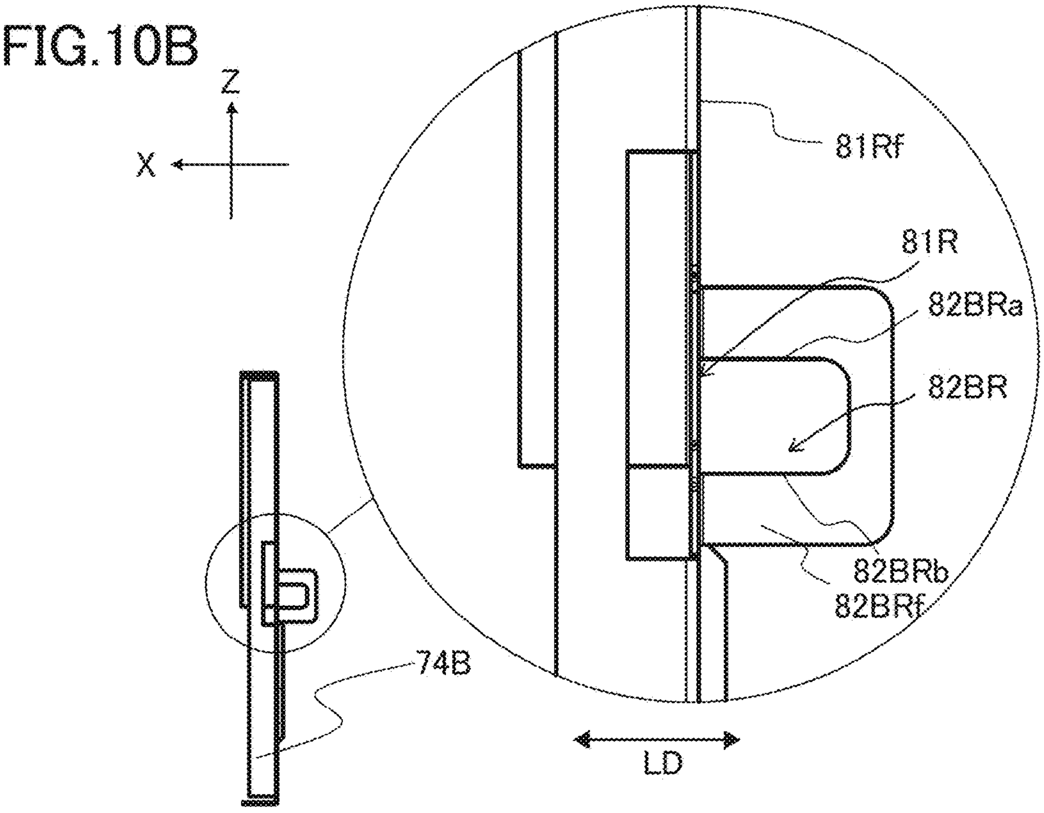
FIG. 10B is a rear side view and an enlarged view illustrating a positioning configuration of the process unit by a right side panel frame.

FIG. 9 is a schematic view illustrating an image forming apparatus 1B according to a second embodiment in a state prior to attaching a process unit 20B serving as a detachable unit. FIG. 10A is a rear view and an enlarged view illustrating a positioning configuration of the process unit 20B by a left side panel frame 73B, and FIG. 10B is a rear view and an enlarged view illustrating a positioning configuration of the process unit 20B according to a right side panel frame 74B.

As illustrated in FIG. 9, the process unit 20B includes the left side face 30L and the right side face 30R serving as end faces in the longitudinal direction LD, and faces 31L and 31R that face the downstream side in the attaching direction AD. The face 31L includes a left rotation regulating boss 22BL serving as a second positioned portion, and the face 31R includes a right rotation regulating boss 22BR. The left rotation regulating boss 22BL and the right rotation regulating boss 22BR are extended downstream in the attaching direction AD. A left positioning boss 21L and a right positioning boss are respectively arranged upstream of the left rotation regulating boss 22BL and the right rotation regulating boss 22BR in the attaching direction AD.

An apparatus body 2B of the image forming apparatus 1B includes the left side panel frame 73B and the right side panel frame 74B composed of sheet metal members, wherein the left side panel frame 73B and the right side panel frame 74B oppose one another with a clearance therebetween in the longitudinal direction LD.

As illustrated in FIGS. 9 and 10A, the left side panel frame 73B includes the first left surface 81Lf that extends in a direction along the attaching direction AD, i.e., Y direction, and the Z direction, and a second left surface 82BLf that extend in a direction along the longitudinal direction LD and the Z direction. The second left surface 82BLf serving as a second surface is arranged inward of the apparatus body 2B from the first left surface 81Lf in the longitudinal direction LD by draw-processing the first left surface 81Lf. That is, the first left surface 81Lf and the second left surface 82BLf are not coplanar. In the present embodiment, the second left surface 82BLf is composed of a surface parallel to the longitudinal direction LD and the Z direction, but the present technique is not limited thereto. For example, the second left surface 82BLf can be a curved surface along the longitudinal direction LD and the Z direction.

In FIG. 10A, a left rotation regulating portion 82BL with which the left rotation regulating boss 22BL can engage is formed on the second left surface 82BLf, wherein the left rotation regulating portion 82BL serving as a second positioning portion is composed of a hole portion penetrated in the attaching direction AD. Further, the left rotation regulating portion 82BL includes faces 82BLa and 82BLb that are engageable with the left rotation regulating boss 22BL in the Z direction. Since the second left surface 82BLf is arranged inward of the apparatus body 2 from the first left surface 81Lf in the longitudinal direction LD, the left rotation regulating portion 82BL is arranged at a position that differs from a left positioning portion 81L in the longitudinal direction LD.

Similarly, as illustrated in FIGS. 9 and 10B, the right side panel frame 74B includes the first right surface 81Rf that extends along the attaching direction AD, i.e., Y direction, and the Z direction, and a second right surface 82BRf that extends along the longitudinal direction LD and the Z direction. The second right surface 82BRf is arranged inward of the apparatus body 2 from the first right surface 81Rf in the longitudinal direction LD by draw-processing the first right surface 81Rf. That is, the first right surface 81Rf and the second right surface 82BRf are not coplanar. In the present embodiment, the first right surface 81Rf and the second right surface 82BRf are composed of a surface parallel to the attaching direction AD, i.e., Y direction, and the Z direction, but the present technique is not limited thereto. For example, the second right surface 82BRf can be a curved surface along the attaching direction AD, i.e., Y direction, and the Z direction.

A right rotation regulating portion 82BR with which the right rotation regulating boss 22BR can engage is formed on the second right surface 82BRf, wherein the right rotation regulating portion 82BR is composed of a hole portion penetrated in the attaching direction AD. Further, the right rotation regulating portion 82BR includes faces 82BRa and 82BRb that are engageable with the right rotation regulating boss 22BR in the Z direction. Since the second right surface 82BRf is arranged inward of the apparatus body 2 from the first right surface 81Rf in the longitudinal direction LD, the right rotation regulating portion 82BR is arranged at a position that differs from a right positioning portion 81BR in the longitudinal direction LD.

Figure 11:
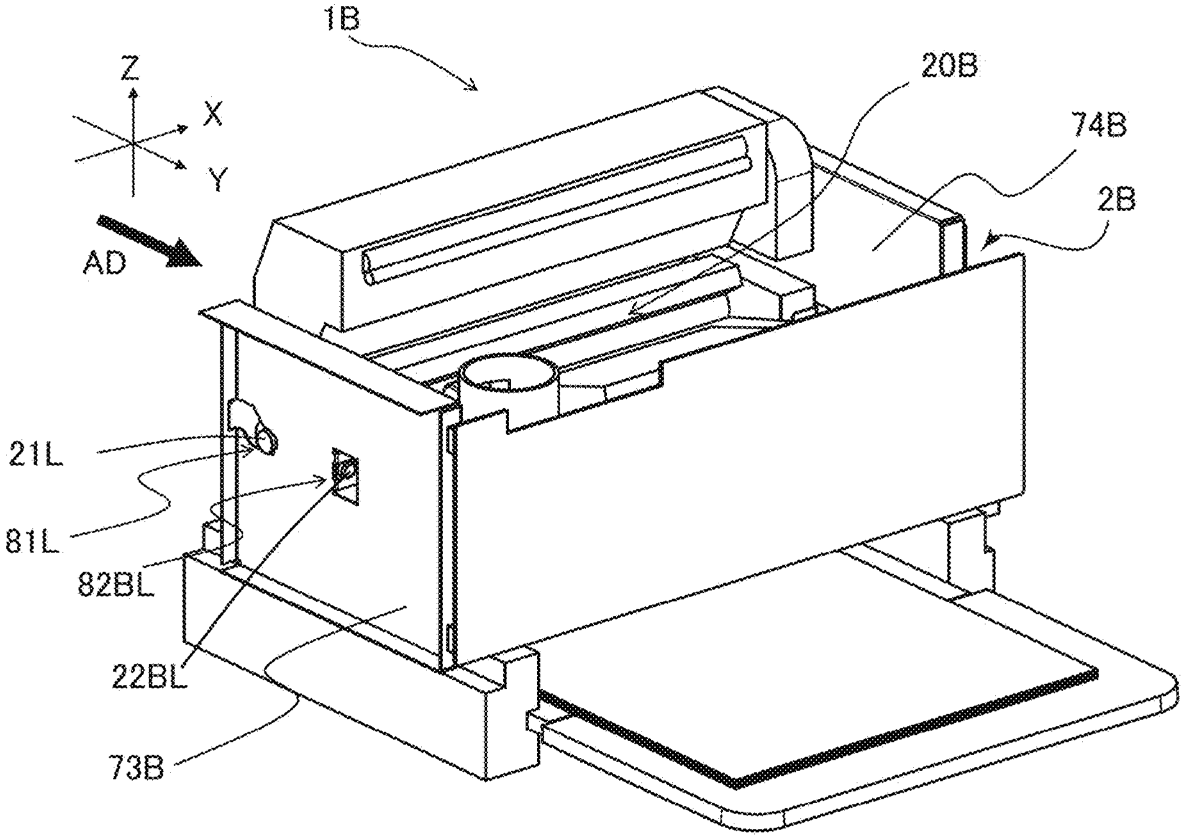
FIG. 11 is a perspective view illustrating the image forming apparatus with the process unit attached.

FIGS. 10A to 11 are schematic views illustrating the image forming apparatus 1B in a state where the process unit 20B is attached. As illustrated in FIG. 11, in a state where the process unit 20B is attached to the apparatus body 2B, the process unit 20B is urged from the rear side toward the front side by an urging mechanism not shown. In a state where the process unit 20B is attached to the apparatus body 2B, the left positioning boss 21L and the left rotation regulating boss 22BL of the process unit 20B are respectively engaged with the left positioning portion 81L and the left rotation regulating portion 82BL of the left side panel frame 73B. Similarly, in a state where the process unit 20B is attached to the apparatus body 2B, the right positioning boss 21R and the right rotation regulating boss 22BR of the process unit 20B are respectively engaged with the right positioning portion 81R and the right rotation regulating portion 82BR of the right side panel frame 74B.

By having the left positioning boss 21L and the right positioning boss 21R respectively engage with the left positioning portion 81L and the right positioning portion 81R, the process unit 20B is positioned in the attaching direction AD. Further, by having the left rotation regulating boss 22BL and the right rotation regulating boss 22BR respectively engage with the left rotation regulating portion 82BL and the right rotation regulating portion 82BR, rotational movement of the process unit 20B about the left positioning boss 21L and the right positioning boss 21R is regulated. That is, the process unit 20B is positioned in the Z direction.

Similar to the first embodiment, the second left surface 82BLf on which the left rotation regulating portion 82BL is formed is arranged on the inner side of the apparatus body 2B in the longitudinal direction LD with respect to the first left surface 81Lf on which the left positioning portion 81L is formed. Further, the left rotation regulating boss 22BL is also arranged inward of the apparatus body 2B in the longitudinal direction LD with respect to the left positioning boss 21L. Thereby, a shape of a hole constituting the left rotation regulating portion 82BL formed on the second left surface 82BLf can be formed in a relatively small area. Since the left positioning portion 81L is arranged upstream of the left rotation regulating portion 82BL in the attaching direction AD, the shape of the cutout constituting the left positioning portion 81L formed on the first left surface 81Lf can also be formed in a relatively small area. As described, by reducing the area of the cutout or the hole formed on the left side panel frame 73B serving as the frame member, the stiffness of the left side panel frame 73B can be ensured.

Similarly, by reducing the area of the cutout or the hole formed on the right side panel frame 74B, the stiffness of the right side panel frame 74B can be ensured. By ensuring the stiffness of the left side panel frame 73B and the right side panel frame 74B, the positioning accuracy of the process unit 20B to the apparatus body 2B can be improved. Further, since it is not necessary to increase the thickness of the left side panel frame 73B and the right side panel frame 74B to enhance the stiffness of the left side panel frame 73B and the right side panel frame 74B, the weight and the cost of the apparatus can be cut down.

Third Embodiment

Next, a third embodiment of the present technique will be described. According to the third embodiment, the fixing unit 9 is configured to be detachably attached to an apparatus body 2C, instead of the process unit 20 as according to the first embodiment. Therefore, configurations similar to the first embodiment are either not shown or denoted with the same reference numbers.

Figure 12:
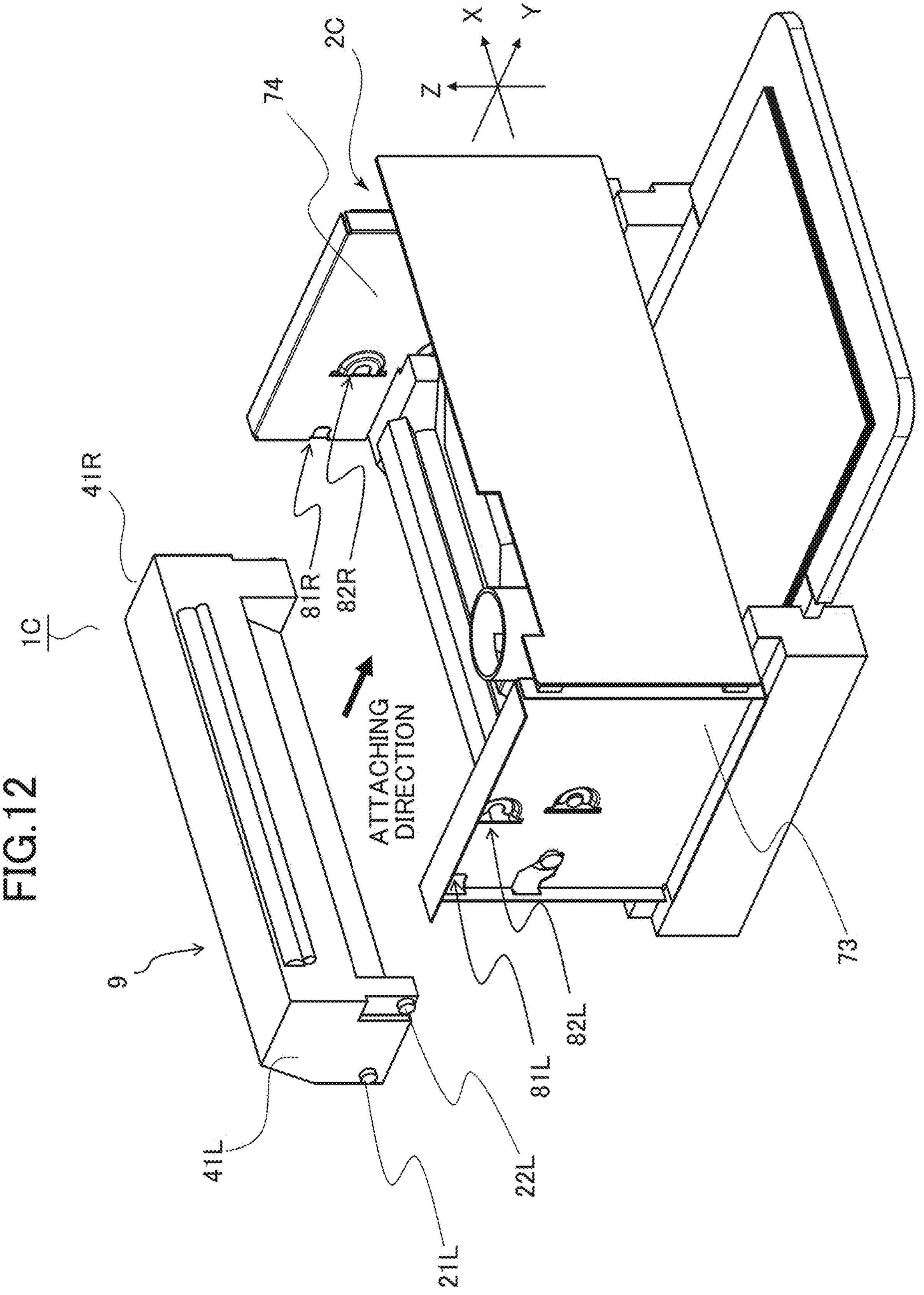
FIG. 12 is a perspective view illustrating an image forming apparatus according to a third embodiment.

FIG. 12 is a schematic view illustrating an image forming apparatus 1C according to the third embodiment in a state prior to attaching the fixing unit 9 serving as a detachable unit and fixing unit. As illustrated in FIG. 12, the fixing unit 9 includes a left side face 41L and a right side face 41R serving as end faces in the longitudinal direction LD parallel to the X direction. The left side face 41L includes the left positioning boss 21L and the left rotation regulating boss 22L, and the right side face 41R similarly includes the right positioning boss 21R and the right rotation regulating boss 22R (refer to FIG. 7B).

Figure 13:
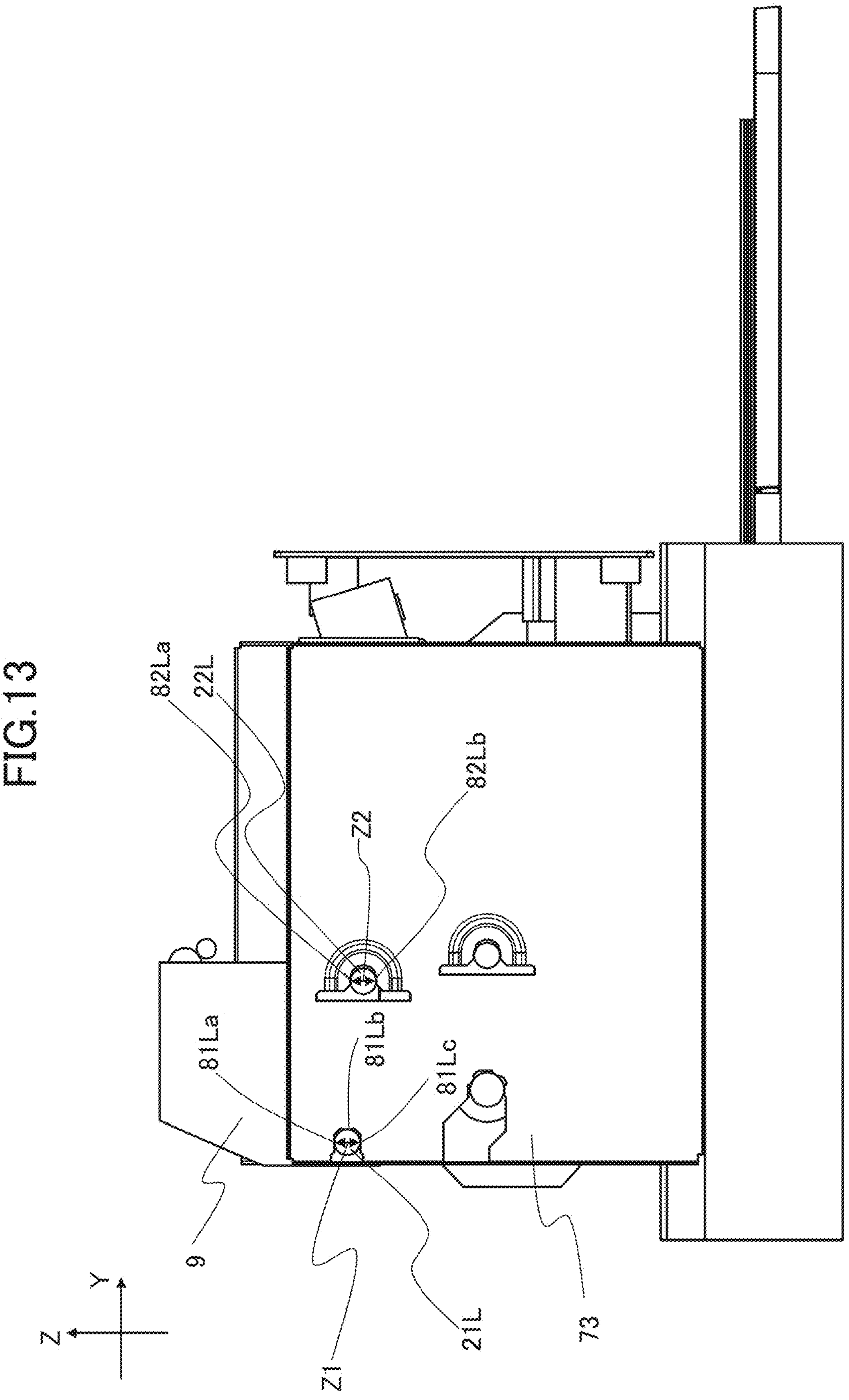
FIG. 13 is a left side view illustrating a positioning configuration of a process unit by a left side panel frame.

FIG. 13 is a left side view illustrating a positioning configuration of the fixing unit 9 by the left side panel frame 73. As illustrated in FIG. 13, in a state where the fixing unit 9 is attached to the apparatus body 2C, the fixing unit 9 is urged from the rear side toward the front side by an urging mechanism not shown. In a state where the fixing unit 9 is attached to the apparatus body 2C, the left positioning boss 21L and the left rotation regulating boss 22L of the fixing unit 9 are respectively engaged with the left positioning portion 81L and the left rotation regulating portion 82L of the left side panel frame 73. Similarly, in a state where the fixing unit 9 is attached to the apparatus body 2C, the right positioning boss 21R and the right rotation regulating boss 22R of the fixing unit 9 are respectively engaged with the right positioning portion 81R and the right rotation regulating portion 82R of the right side panel frame 74.

By having the left positioning boss 21L and the right positioning boss 21R respectively engage with the left positioning portion 81L and the right positioning portion 81R, the fixing unit 9 is positioned in the attaching direction AD. Further, by having the left rotation regulating boss 22L and the right rotation regulating boss 22R respectively engage with the left rotation regulating portion 82L and the right rotation regulating portion 82R, rotational movement of the fixing unit 9 about the left positioning boss 21L and the right positioning boss 21R is regulated. That is, the fixing unit 9 is positioned in the Z direction.

The left positioning boss 21L, the left rotation regulating boss 22L, the right positioning boss 21R, and the right rotation regulating boss 22R adopt a similar configuration as the first embodiment, such that the descriptions thereof are omitted. Also according to the present embodiment, an effect similar to the first embodiment is exerted.

Other Embodiments

According to all the embodiments described above, the process unit 20, 20B or the fixing unit 9 is attached from the rear side toward the front side of the apparatus body 2, 2B, or 2C, but the present technique is not limited thereto. In other words, the attaching direction AD is not limited to the direction along the Y direction.

According to all the embodiments described above, the boss-shaped positioning boss and the rotation regulating boss are provided on the process unit 20, 20B or the fixing unit 9, but the present technique is not limited thereto. In other words, a non-boss-shaped positioning member and a rotation regulating member can be provided on the process unit 20, 20B or the fixing unit 9.

Further according to the first and second embodiments, the process unit 20 or 20B including the photosensitive drum 11, the developing roller 12 and the storage portion 18 is configured to be detachably attached to the apparatus body 2 or 2B, but the present technique is not limited thereto. For example, instead of the process unit, only the storage portion 18 storing toner or a developing unit including the developing roller 12 and the storage portion 18 without the photosensitive drum 11 can be positioned by the above-mentioned positioning configuration on the apparatus body 2.

According to all the embodiments described above, the left positioning portion 81L is arranged upstream of the left rotation regulating portion 82L or 82BL according to the attaching direction AD, but the present technique is not limited thereto. For example, the left positioning portion 81L can be arranged downstream of the left rotation regulating portion 82L or 82BL in the attaching direction AD. In this case, the left positioning portion 81L is preferably arranged on the second left surface 82Lf or 82BLf and the left rotation regulating portion 82L is preferably arranged on the first left surface 81Lf.

According to all the embodiments described above, the image forming apparatus 1, 1B, or 1C adopting the electrophotographic system has been illustrated, but the present technique is not limited thereto. For example, the present invention can be applied to an image forming apparatus that adopts an ink jet system in which liquid ink is discharged through nozzles to form images on sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-086128, filed May 21, 2021, which is hereby incorporated by reference herein in its entirety.

What is claimed is:

1. An image forming apparatus configured to form an image on a sheet, the image forming apparatus comprising:
- an apparatus body including a frame member, the frame member including:
  - a first positioning portion; and
  - a second positioning portion; and
- a detachable unit detachably attached to the frame member in an attaching direction, the detachable unit including:
  - a first positioned portion provided in an end portion of the detachable unit in a second direction intersecting the attaching direction, and configured to engage with the first positioning portion; and
  - a second positioned portion configured to engage with the second positioning portion and provided:
    - in the end portion of the detachable unit in the second direction; and
    - downstream of the first positioned portion in the attaching direction,
  - wherein either the first positioned portion or the second positioned portion is positioned in the attaching direction, in a case where the detachable unit is attached to the apparatus body, and
  - wherein the other of the first positioned portion or the second positioned portion is restricted in rotation in a first direction, in the case where the detachable unit is attached to the apparatus body, the first direction intersecting both the attaching direction and the second direction,
- wherein the second positioning portion is arranged closer to a center portion of the detachable unit in the second direction than the first positioning portion.

2. The image forming apparatus according to claim 1, wherein the first positioning portion is a slit formed on the frame member, the slit:
- extending in the attaching direction from an upstream edge of the frame member; and
- having an upstream side in the attaching direction opened.

3. The image forming apparatus according to claim 2, wherein the second positioning portion is part of an opening provided on the frame member.

4. The image forming apparatus according to claim 1, wherein:
- the frame member includes a first surface and a second surface,
- the first and second surfaces extend in the attaching direction and the first direction,
- the second surface is formed by draw-processing so that the second surface is positioned closer to the center portion of the detachable unit in the second direction than the first surface,
- the first positioning portion is provided on the first surface, and
- the second positioning portion is provided on the second surface.

5. The image forming apparatus according to claim 1, wherein:
- the first positioning portion is part of a first opening provided on the frame member, and
- the second positioning portion is part of a second opening provided on the frame member.

6. The image forming apparatus according to claim 1, wherein:
- the frame member includes:
  - a first surface extending in the attaching direction and the first direction; and
  - a second surface extending in the first direction and the second direction,
- the first positioning portion is provided on the first surface, and
- the second positioning portion is provided on the second surface.

7. The image forming apparatus according to claim 1, wherein the detachable unit includes a toner storage portion configured to store toner.

8. The image forming apparatus according to claim 7, wherein the detachable unit includes an inlet port through which toner is supplied into the toner storage portion.

9. The image forming apparatus according to claim 1, wherein the detachable unit includes a fixing unit configured to fix a toner image to the sheet by heat and pressure.

10. The image forming apparatus according to claim 1, wherein the detachable unit includes a rotatable member configured to rotate about a rotational axis extending in the second direction.

11. The image forming apparatus according to claim 1, wherein:

the frame member is formed of a sheet metal, and the second positioning portion is a cutout-shaped portion formed on the frame member with an upstream side in the attaching direction opened.

* * * * *